(12) United States Patent
Kamiji

(10) Patent No.: US 7,788,805 B2
(45) Date of Patent: Sep. 7, 2010

(54) METHOD FOR MANUFACTURING ROCKER ARM

(75) Inventor: Michiyuki Kamiji, Osaka (JP)

(73) Assignees: Nakanishi Metal Works Co., Ltd., Osaka-shi (JP); OTICS Corporation, Nishio-shi (JP)

( * ) Notice: Subject to any disclaimer, the term of this patent is extended or adjusted under 35 U.S.C. 154(b) by 121 days.

(21) Appl. No.: 11/990,783

(22) PCT Filed: Aug. 1, 2006

(86) PCT No.: PCT/JP2006/315206

§ 371 (c)(1),
(2), (4) Date: Feb. 21, 2008

(87) PCT Pub. No.: WO2007/023647

PCT Pub. Date: Mar. 1, 2007

(65) Prior Publication Data

US 2009/0144977 A1  Jun. 11, 2009

(30) Foreign Application Priority Data

Aug. 22, 2005  (JP) .............................. 2005-239821

(51) Int. Cl.
*B21D 22/00*  (2006.01)

(52) U.S. Cl. .......................... 29/888.2; 29/557; 72/349; 72/379.2; 72/352; 72/361

(58) Field of Classification Search ................ 29/888.2, 29/557; 72/349, 379.2, 352, 361
See application file for complete search history.

(56) References Cited

U.S. PATENT DOCUMENTS 1,688,111 A * 10/1928 Bohle .......................... 72/349
6,748,788 B2 * 6/2004 Yamano et al. ............. 72/379.2
2003/0094153 A1 * 5/2003 Abe ........................ 123/90.39
2004/0000277 A1 * 1/2004 Motohashi ............... 123/90.39
2004/0000278 A1 * 1/2004 Motohashi ............... 123/90.39
2004/0261739 A1 * 12/2004 Shimizuya ............... 123/90.44

(Continued)

FOREIGN PATENT DOCUMENTS

JP  9-239480  9/1997

(Continued)

*Primary Examiner*—David P Bryant
*Assistant Examiner*—Christopher Besler
(74) *Attorney, Agent, or Firm*—Kratz, Quintos & Hanson, LLP

(57) ABSTRACT

The present invention provides a rocker arm manufacturing method capable of improving the durability and excellent in productivity. In the method according to the present invention, an intermediate product 13 having both side walls 20 extended in a predetermined direction and arranged in parallel with each other and one end side connection wall 30 connecting lower ends of a longitudinal one end of both the side walls is obtained. Next, both side walls 20 formed at the one end of the intermediate product 13 are inwardly bent. Thereafter, ironing dies 60 are pressed down against outer surfaces of both the inclined side walls 20 from an upper side to a lower side to execute ironing of outer surface portions of both the side walls 20 to downwardly plastically fluidize the constituent material of both the side walls 20 to thereby form valve stem guide walls 35 at both sides of the one end side connection wall 30 in a downwardly protruded manner.

4 Claims, 6 Drawing Sheets

U.S. PATENT DOCUMENTS

2005/0087162 A1* 4/2005 Smith et al. .............. 123/90.39
2007/0000297 A1* 1/2007 Nozaki et al. ................. 72/356

FOREIGN PATENT DOCUMENTS

| | | |
|---|---|---|
| JP | 11-270311 | 10/1999 |
| JP | 2001-191139 | 7/2001 |
| JP | 2001-198641 | 7/2001 |
| JP | 2004-025240 | 1/2004 |
| JP | 2004-27967 | 1/2004 |
| JP | 2007-007718 | 1/2007 |

* cited by examiner

METHOD FOR MANUFACTURING ROCKER ARM

TECHNICAL FIELD

The present invention relates to a method for manufacturing a rocker arm for opening and closing a valve in a valve gear for use in, e.g., vehicle internal combustion engines.

BACKGROUND TECHNIQUE

A valve gear for use in vehicle internal combustion engines is provided with a rocker arm for converting a rotary motion of a cam which rotates in conjunction with a crankshaft into a reciprocating motion of a valve stem for a valve, such as, e.g., an intake valve or an exhaust valve. This rocker arm is configured to swing about the pivot axis as a fulcrum located at a longitudinal end portion thereof in accordance with the rotary motion of a cam to cause up-and-down motions of a valve stem by pressing down the swinging end portion of the rocker arm to thereby open and close the valve.

A rocker arm is provided with a valve stem contacting end portion of a U-shape in cross-section at a longitudinal one end thereof so that a valve stem is brought into contact with the bottom wall (connection wall) of the valve stem contacting end portion. Furthermore, at both sides of the lower surface of the connection wall of the valve stem contacting end portion, a pair of valve stem guide walls extended in the longitudinal direction of the rocker arm are provided. It is configured such that a valve stem is disposed between these guide walls to prevent the horizontal displacements of the rocker arm with respect to the valve stem.

This kind of rocker arm is complicated in configuration and required to have high rigidity. Therefore, conventionally, such rocker arm is generally manufactured by forging or precision casting (lost-wax process).

In recent years, however, in accordance with the increased rotating speed and increased output of an internal combustion engine, it has been required to attain a lighter rocker arm to reduce the inertia weight. Thus, a number of techniques for manufacturing a rocker arm by press working have been proposed.

In manufacturing a rocker arm by press working, as a processing method of a valve stem contacting end portion, for example, a processing method as disclosed by the following Patent Document 1 is well known. In this method, a valve stem contacting end portion formed into a U-shape in cross-section by pressing working is subjected to pressure forming to increase the thickness of the lower both sides of the bottom wall of the valve stem contacting end portion to obtain the increased thickness portions, and then the increased thickness portions are subjected to pressure forming to form protruded portions as valve stem guide walls. Patent Document 1: Japanese Unexamined Laid-open Patent Publication No. 2001-198641 (see claims and FIGS. 4 to 12)

DISCLOSURE OF THE INVENTION

Problems to be Solved by the Invention

In the manufacturing method of a conventional rocker arm disclosed in the aforementioned Patent Document 1, pressure forming is executed to cause the plastic flow (material flow) of the constituent metallic material for the purpose of, e.g., increasing the thickness of the valve stem contacting end portion or forming the increased thickness portions.

In such a plastic flow processing, however, it is difficult to accurately control the flow direction or flow amount of the material. For example, a large amount of material cannot be moved at one time, and therefore pressure forming will be normally repeated several times to gradually obtain a desired configuration. As a result, there are problems that the production efficiency is low and that the frequency of usage of a die, such as, e.g., a pressure punch, is high, causing early deterioration of the die, which results in poor durability.

The present invention was made to solve the aforementioned conventional problems and aims to provide a rocker arm manufacturing method capable of improving durability of a die, e.g., extending a die life, and attaining enhanced productivity.

Means to Solve the Problems

In order to attain the aforementioned objects, the present invention has the following features.

[1] A method for manufacturing a rocker arm, the method comprising:

a step of obtaining an intermediate product having both side walls extended in a predetermined direction and arranged in parallel with each other and a one end side connection wall connecting lower ends of both the side walls at a longitudinal one end side of the intermediate product;

a side wall bending step of inwardly bending both the side walls formed at the one end of the intermediate product; and an ironing step of forming valve stem guide walls at both sides of the one end side connection wall in a downwardly protruded manner by pressing down ironing dies against outer surfaces of both the inclined side walls from an upper side to a lower side to execute ironing of outer surface portions of both the side walls to plastically fluidize constituent material of both the side walls.

[2] The method for manufacturing a rocker arm as recited in the aforementioned Item 1, wherein, at the ironing step, the intermediate product is secured by clamping the one end side connection wall by and between an upper die and a lower die, and the ironing dies are pressed down in a state in which gaps are formed between the upper die and inner surfaces of basal end portions of the side walls.

[3] The method for manufacturing a rocker arm as recited in the aforementioned Items 1 or 2, wherein non-ironing processed portion is provided at longitudinal end portions of both the side walls.

EFFECTS OF THE INVENTION

According to the rocker arm manufacturing method of the invention [1], at the time of forming the guide walls at the one end side connection wall, after bending both side walls so as to be inwardly tilted, the outer surface portions of both side walls are subjected to ironing processing to plastically fluidize downward to form the guide walls. Therefore, the guide walls can be assuredly formed by single ironing processing. As a result, the production efficiency can be improved and the frequency of usage of dies, such as, e.g., ironing dies and upper and lower dies, can be decreased to enhance the durability of the dies.

According to the rocker arm manufacturing method of the invention [2], swelled portions will be formed at basal end inner surfaces of both side walls, resulting in strongly secured side walls. Thus, a rocker arm having sufficient strength can be manufactured assuredly.

According to the rocker arm manufacturing method of the invention [3], since non-ironing processed portion will be provided at longitudinal end portions of both side walls formed at one end portion of the intermediate product, at the time of ironing the outer surface portions of both side walls, it is possible to assuredly prevent the longitudinal plastic flow of the constituent material of both side walls, resulting in more accurate control of the material movements.

BRIEF DESCRIPTION OF THE DRAWINGS

FIG. 1(c) is a perspective view showing a bent product having holes.

FIG. 7(b) is a bottom view thereof.

Figure 1:
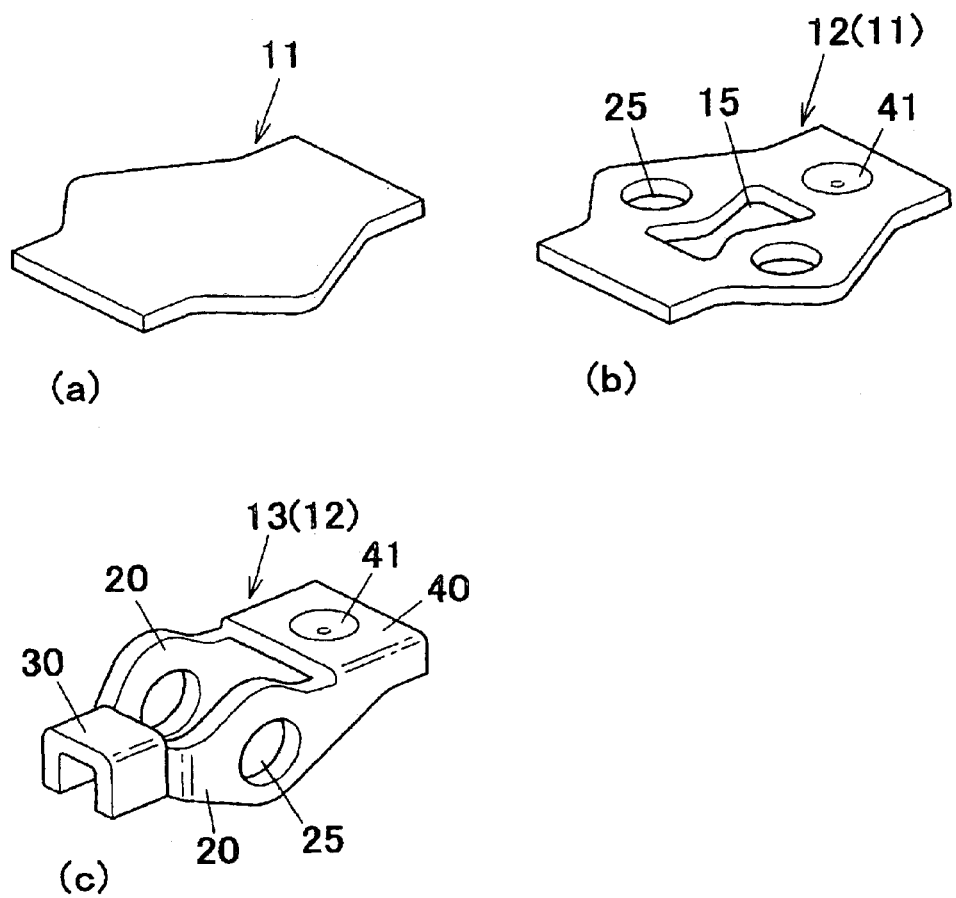
FIGS. 1 (a) to (c) are perspective views each showing a processed product at each processing step in a rocker arm manufacturing method according to an embodiment of the present invention, wherein FIG. 1 (a) is a perspective view showing a flat blank product, FIG. 1 (b) is a perspective view showing a flat blank product having holes.

DESCRIPTION OF REFERENCE NUMERALS 10 rocker arm
13 bent product (intermediate product)
20 both side walls
30 one end side connection wall
31a non-ironing processed portion
35 valve stem guide wall
51 upper die
52 lower die
60 ironing die
61 ironing portion
S gap

BEST MODE FOR CARRYING OUT THE INVENTION

Hereinafter, a rocker arm manufacturing method according to an embodiment of the present invention will be detailed with reference to drawings.

Figure 2:
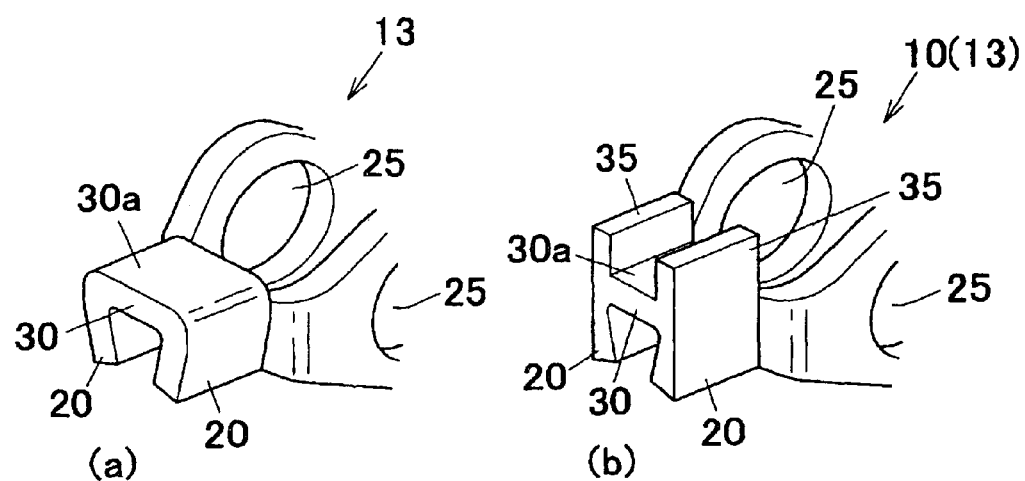
FIGS. 2 (a) and (b) are perspective views each showing a valve stem contacting end portion at each guide wall forming processing step according to the manufacturing method of the embodiment, wherein FIG. 2 (a) is a perspective view in the state immediately after completion of the bending step of both side walls, and wherein FIG. 2 (b) is a perspective view thereof in the state immediately after completion of the ironing step.

As shown in FIGS. 1 and 2, a rocker arm 10 to be manufactured in this embodiment is provided with a pair of side walls 20 extended in a longitudinal direction of the rocker arm and disposed in parallel with each other, a one end side connection wall 30 connecting the longitudinal one end side (valve stem contacting side) lower ends of both side walls 20, and the other end side connection wall 40 connecting the other end side lower ends of both side walls 20 and having a pivot engaging concave portion 41. Both side walls 20 each has a shaft fixing hole 25 at its intermediate portion. At both side portions of the lower surface side of the one end side connection wall 30, a pair of valve stem guide walls 35 disposed in parallel with each other and extended in the longitudinal direction of the rocker arm are formed. Thus, the lower surface of the one end side connection wall 30 between both guide walls 35 constitutes a valve stem contacting surface 30a having a predetermined curvature for supporting a valve stem.

In manufacturing a rocker arm 10 having the aforementioned structure, initially, as shown in FIG. 1(a), predetermined regions of a steel plate as an original plate are punched out to obtain a flat blank product 11 having both sides each protruded in an arc-shape.

Then, as shown in FIG. 1(b), a hole forming punch is driven into the flat blank product 11 to punch out the intermediate region of the flat blank product 11 to form a hand-drum shaped central hole 15. Also predetermined regions in both side portions are punched out to form round shaft fixing holes 25. Thus, a flat blank product 12 having holes is obtained.

Furthermore, the intermediate region of one end portion of the flat blank product 11 is dented by stretch forming to form a semispherical pivot engaging concave portion 41.

In executing the blanking processing for punching out the original plate, the punching processing for forming the central hole 15, the punching processing for forming the shaft fixing holes 25 and the stretch forming processing for forming the pivot engaging concave portion 41, the processing order is not limited and the processing can be performed in any order. For example, all of the aforementioned processing can be performed simultaneously, or two or more processing can be performed simultaneously. Alternatively, each processing can be performed in order.

Next, as shown in FIG. 1(c), the flat blank product 12 with holes is bent into a U-shape (inverted U-shape) to obtain a bent product 13 having holes.

It should be noted that FIG. 1(c) illustrates the product in an upside-down manner with respect to the actual usage state to facilitate understanding of the invention (FIG. 2 also illustrate in the same manner).

Figure 3:
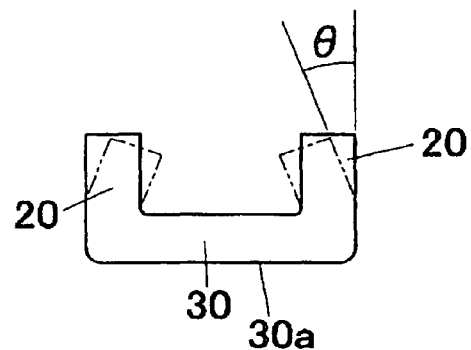
FIG. 3 is a cross-sectional view showing the valve stem contacting end portions of the bent product manufactured by the manufacturing method of the embodiment.

As shown in FIGS. 1(c) and 3, this bent product 13 is provided with both side walls 20, the one end side connection wall 30 connecting the lower ends of one end portions of both side walls 20, and the other end side connection wall 40 connecting the lower ends of the other end portions of both side walls 20 and having the pivot engaging concave portion 41.

Next, as shown in FIG. 2(a) and FIG. 3 (see phantom lines), bending work is executed so that both side walls 20 located at the one end side end portion (valve stem contacting end portion) of the bent product 13 is bent so as to be tilted inward (toward the facing direction).

At this time, as shown in FIG. 3, the inclination angle θ of the side wall 20 is preferably set to 5 to 40°, more preferably 10 to 30°, which will be detailed later.

After the bending work of both side walls 20, ironing (piercing) is executed against the outer surface portions of both side walls 20 of the bent product 13.

Figure 4:
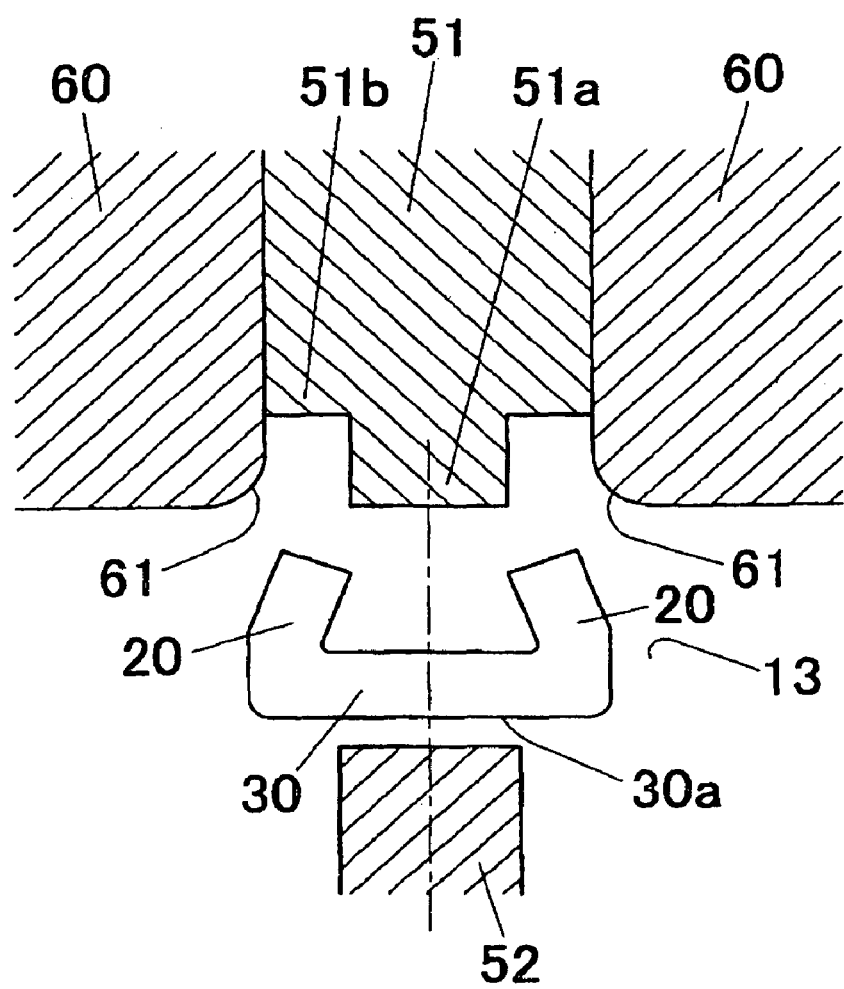
FIG. 4 is a cross-sectional view showing the ironing processing device used in the manufacturing method of the embodiment.

As shown in FIG. 4, a device for executing the ironing is provided with upper and lower dies 51 and 52 configured to clamp the bent product 13 therebetween and ironing dies 60 arranged at both sides of the upper die 51.

The upper die 51 is configured to be inserted in between both side walls 20 formed at the one end portion of the bent product 13, and is provided with an intermediate portion 51a for immovably supporting the inner surface of the one end side connection wall 30 and both side portions 51b for immovably supporting the upper ends of both side walls 20. The lower die 52 is configured to immovably support the intermediate region (valve stem contacting surface 30a) of the lower surface of the one end side connection wall 30 other than both side portions thereof. In this embodiment, it is configured such that the upper die 51 is movable in the up-and-down direction and that the bent product 13 can be supported by and between the upper and lower dies 51 and 52 by lowering the upper die 51 after disposing the bent product 13 on the lower die 52 in a state in which the upper and lower dies 51 and 52 are away from each other.

The lower die 52 is formed to have a width corresponding to the width of the valve stem contacting surface 30a. At the time of pressing operation of the ironing die which will be mentioned later, the lower die 52 is configured to restrain the inner side surfaces of the guide walls 35 to define the intervening size of the guide walls 35 accurately.

The ironing dies 60 are movably arranged in the up-and-down direction at both sides of the upper die 51. In this ironing die 60, the ironing portion 61 formed at the lower inner peripheral edge portion is formed into an R-surface having a predetermined curvature.

Figure 5:
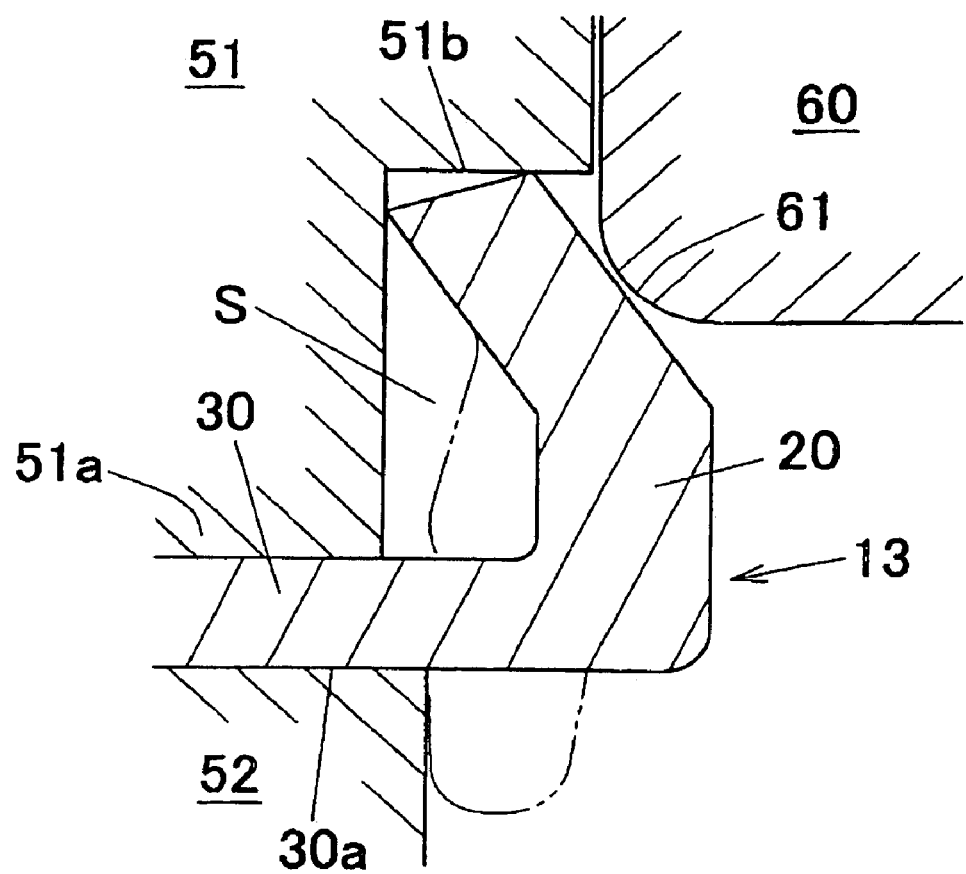
FIG. 5 is a cross-sectional view in the state immediately before the ironing step of the ironing processing device of the embodiment.

In this embodiment, as shown in FIG. 5, at the time of executing the ironing processing, the lower and upper dies 51 and 52 clamp the bent product 13 from the upper and lower sides thereof to support and secure the bent product. In this state, between the tip ends of both side surfaces of the intermediate portion 51a of the upper die 51 and the basal end side inner surfaces of both side walls 20 of the bent product 13, a gap S is formed. The round curved ironing portions 61 of the ironing dies 60 are disposed so as to face the inclined outer surfaces of the side walls 20 of the bent product 13.

Figure 6:
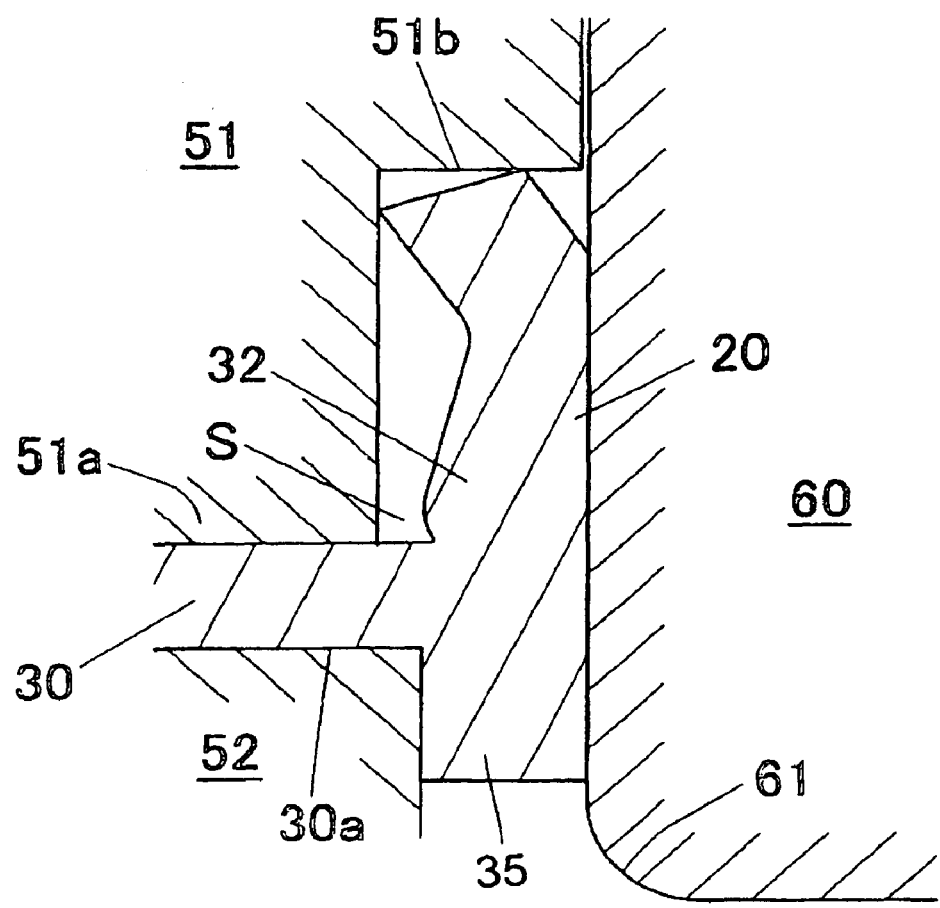
FIG. 6 is a cross-sectional view in the state immediately after the ironing step of the ironing processing device of the embodiment.
Figure 7:
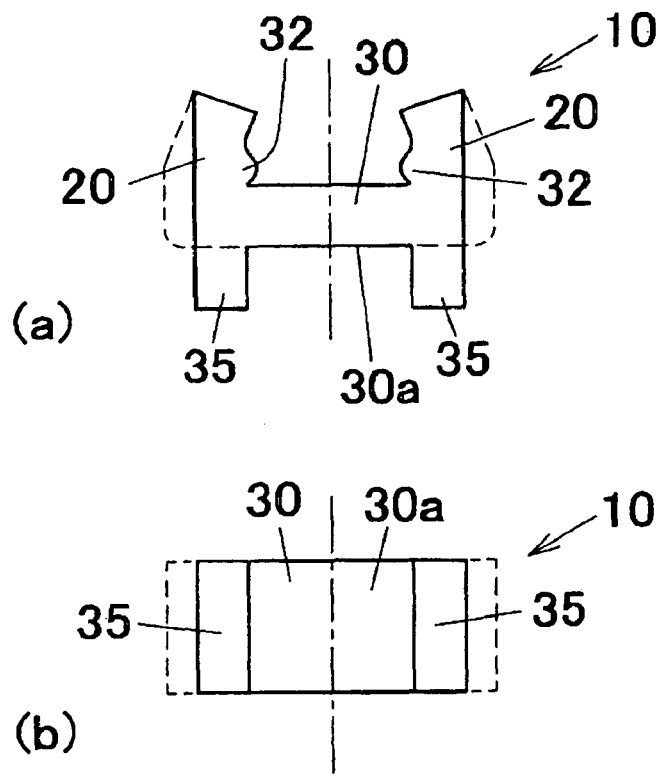
FIGS. 7 (a) and (b) are views showing the valve stem contacting end portion of the rocker arm manufactured by the manufacturing method of the embodiment, wherein FIG. 7 (a) is a front view thereof

From this state, as shown in FIG. 6, the ironing dies 60 are pressed downward along the vertical direction to execute the ironing (pierce forming) of the outer surface portions of both side walls 20. As shown in FIGS. 2(b) and 7, this in turn causes downward plastic flow of the constituent material of both side walls 20, forming valve stem guide walls 35 extended in the longitudinal direction at both sides of the lower surface of the one end side connection wall 30, and also causes inward plastic flow of the constituent material of both side walls 20, forming swelled portions 32 at the basal end side inner surface of both side walls 20.

At the side wall bending step, as mentioned above, in cases where the bending angle θ of each side wall 20 of the bent product 13 is adjusted so as to fall within the aforementioned specific range, the plastic flow of the constituent material of both side walls 20 by the ironing can be accurately controlled to form desired valve stem guide walls 35. In other words, when the bending angle θ is too large, although it is possible to secure a large ironing amount, the large ironing amount causes a smaller connection portion between the side wall 20 and the connection wall 30, which may cause detachment of the side wall 20. To the contrary, when the bending angle θ is too small, a large ironing amount cannot be secured, which may cause difficulty in forming a valve stem guide wall 35 having a sufficient size.

At the time of the ironing processing, the lower die 52 restrains the inner side surfaces of the valve stem guide walls 35, assuredly preventing the guide walls 35 from being deformed inwardly, which results in high degree of dimensional accuracy.

As mentioned above, according to the rocker arm manufacturing method of this embodiment, in forming the guide walls 35 on the one end side connection wall 30, after inwardly bending both side walls 20, the outer surface portions of both side walls 20 are subjected to ironing to cause downward plastic flows of the constituent material to form the guide walls 35. Therefore, the guide walls 35 can be assuredly and stably formed.

Furthermore, in this embodiment, since the constituent material of both side walls 20 is plastically fluidized by ironing, the guide walls 35 can be assuredly formed by single press forming as ironing. Accordingly, the productivity can be improved and the frequency of usage of dies, such as, e.g., ironing dies, upper and lower dies, can be decreased, resulting in improved durability of dies, i.e., extended life time of dies.

In the present invention, however, ironing can be performed several times to gradually form the guide walls 35.

Furthermore, in this embodiment, since swelled portions 32 are formed at basal end side inner surfaces of both side walls 20 to strengthen the basal end portions of both side walls 20, both side walls 20 can be secured strongly. Thus, a rocker arm 10 having sufficient strength can be manufactured.

Figure 8:
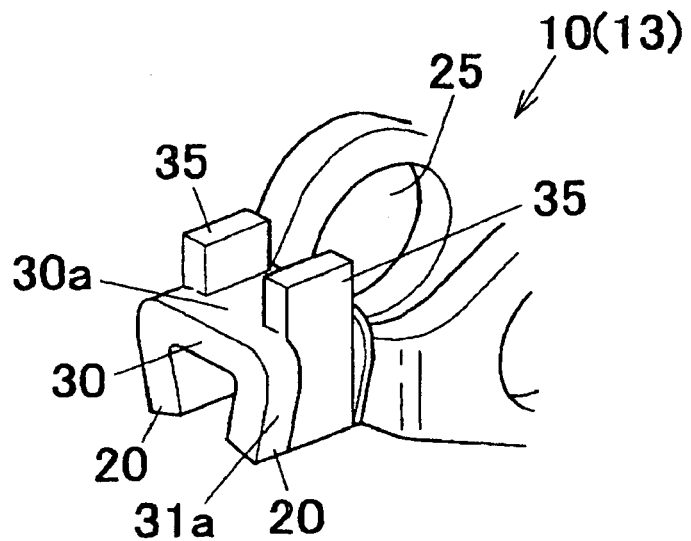
FIG. 8 is a perspective view showing the valve stem contacting end portion of the rocker arm manufactured by the manufacturing method of the modified embodiment of the present invention.

FIG. 8 is a perspective view showing one end side portion of a rocker arm manufactured by a manufacturing method according to a modified embodiment of this invention. As shown in this figure, in this modified embodiment, at the front end portions of both side walls 20 at the one end side portion of the rocker arm 10, non-ironing processed portions 31a is provided. The other structures are the same as those of the aforementioned embodiment.

According to this modified embodiment, in addition to the aforementioned functions and effects, at the time of ironing the outer surface portions of both side walls 20, it is possible to assuredly prevent the constituent material of both side walls from being plastically fluidized forward, resulting in more accurate control of the material flows. Thus, guide walls 35 further enhanced in accuracy of dimension can be formed.

This application claims priority to Japanese Patent Application No. 2005-239821 filed on Aug. 22, 2005, the entire disclosure of which is incorporated herein by reference in its entirety.

The terms and descriptions used herein are intended to explain the embodiments of the present invention and the present invention is not limited thereto. The present invention allows any design modifications falling within the scope of claims unless it extends beyond the spirits of the present invention.

INDUSTRIAL APPLICABILITY

The present invention can be applied to a method of manufacturing a rocker arm for opening and closing a valve for use in, e.g., a valve gear for vehicle internal combustion engines.

The invention claimed is:

1. A method for manufacturing a rocker arm, the method comprising:
a step of obtaining an intermediate product having two side walls with both side walls extended in a predetermined direction and arranged in parallel with each other and having a one side connection wall connecting lower ends of both the side walls at a longitudinal one end side of the intermediate product;

a side wall bending step of inwardly bending both the side walls formed at the one end of the intermediate product; and an ironing step of forming valve stem guide walls at both sides of the one end side connection wall in a downwardly protruded manner by pressing down ironing dies against outer surfaces of both the inclined side walls from an upper side to a lower side to execute ironing of outer surface portions of both the side walls to plastically fluidize constituent material of both the side walls.

2. The method for manufacturing a rocker arm as recited in claim 1, wherein, at the ironing step, the intermediate product is secured by clamping the one end side connection wall by and between an upper die and a lower die, and the ironing dies are pressed down in a state in which gaps are formed between the upper die and inner surfaces of basal end portions of the side walls.

3. The method for manufacturing a rocker arm as recited in claim 1, wherein non-ironing processed portion is provided at longitudinal end portions of both the side walls.

4. The method for manufacturing a rocker arm as recited in claim 2, wherein non-ironing processed portion is provided at longitudinal end portions of both the side walls.

* * * * *